US011508368B2

(12) United States Patent
Suzuki et al.

(10) Patent No.: US 11,508,368 B2
(45) Date of Patent: Nov. 22, 2022

(54) AGENT SYSTEM, AND, INFORMATION PROCESSING METHOD

(71) Applicant: HONDA MOTOR CO., LTD., Tokyo (JP)

(72) Inventors: Tomohiro Suzuki, Wako (JP); Junichiro Onaka, Wako (JP); Koichi Tanizaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 206 days.

(21) Appl. No.: 16/779,700

(22) Filed: Feb. 3, 2020

(65) Prior Publication Data

US 2020/0251108 A1 Aug. 6, 2020

(30) Foreign Application Priority Data

Feb. 5, 2019 (JP) ............................ JP2019-018971

(51) Int. Cl.

*G10L 15/22* (2006.01)
*G10L 15/05* (2013.01)
*G06F 16/9035* (2019.01)
*G10L 15/26* (2006.01)
*G06V 20/59* (2022.01)

(52) U.S. Cl.

CPC .......... *G10L 15/22* (2013.01); *G06F 16/9035* (2019.01); *G06V 20/597* (2022.01);
(Continued)

(58) Field of Classification Search

CPC ......... G10L 15/22; G10L 15/05; G10L 15/06; G10L 15/25; G10L 15/08; G10L 15/24;
(Continued)

(56) References Cited

U.S. PATENT DOCUMENTS 6,363,156 B1 * 3/2002 Roddy ................. H04B 1/3822 381/71.4
9,881,610 B2 * 1/2018 Connell, II ............. G10L 15/25
(Continued)

FOREIGN PATENT DOCUMENTS

JP 2003-061184 2/2003
JP 2003-106861 4/2003
(Continued)

OTHER PUBLICATIONS

Japanese Office Action for Japanese Patent Application No. 2019-018971 dated Aug. 30, 2022.

*Primary Examiner* — Vijay B Chawan
(74) *Attorney, Agent, or Firm* — Amin, Turocy & Watson, LLP

(57) ABSTRACT

An agent system includes: a recognizer configured to recognize speech including speech contents of an occupant in a mobile object; an acquirer configured to acquire an image including the occupant; and an estimator configured to compare wording included in the speech contents of the occupant recognized by the recognizer with unclear information which is stored in a storage and includes wording making the speech contents unclear, to estimate a first direction which is a sight direction of the occupant or a second direction which is indicated by the occupant on the basis of the image acquired by the acquirer when the speech contents of the occupant includes unclear wording, and to estimate an object which is located in the estimated first direction or the estimated second direction. The recognizer is configured to recognize the speech contents of the occupant on the basis of the object estimated by the estimator.

15 Claims, 13 Drawing Sheets

(52) U.S. Cl.
CPC .............. *G10L 15/05* (2013.01); *G10L 15/26* (2013.01); *G10L 2015/228* (2013.01)

(58) Field of Classification Search
CPC ....... G10L 15/26; G10L 15/16; G10L 15/285; G10L 2015/223; G10L 2015/227; G10L 2015/228; G06N 3/008; G06N 5/247; G06V 20/597; G06V 20/9035
USPC ...................... 704/270, 275, 270.1, 231, 240
See application file for complete search history.

(56) References Cited

U.S. PATENT DOCUMENTS

| | | | | |
|---|---|---|---|---|
| 10,747,499 | B2 * | 8/2020 | Taki | G10L 15/08 |
| 11,031,012 | B2 * | 6/2021 | Cech | G06T 7/254 |
| 11,122,367 | B2 * | 9/2021 | Augst | B60K 37/06 |
| 2018/0150279 | A1 * | 5/2018 | Taki | G06F 3/1423 |
| 2019/0251973 | A1 * | 8/2019 | Kume | G06F 3/165 |
| 2019/0378515 | A1 * | 12/2019 | Kim | G10L 17/00 |
| 2020/0037073 | A1 * | 1/2020 | Augst | G06F 3/017 |

FOREIGN PATENT DOCUMENTS

| | | |
|---|---|---|
| JP | 2007-286136 | 11/2007 |
| JP | 4976903 | 7/2012 |
| JP | 2013-011483 | 1/2013 |
| JP | 2015-041197 | 3/2015 |
| JP | 2017-122640 | 7/2017 |
| JP | 2017-156954 | 9/2017 |
| JP | 2017-208056 | 11/2017 |

* cited by examiner

| UNCLEAR INFORMATION |
|---|
| THIS |
| ITS |
| THAT |
| IT |
| THIS SIDE |
| ... |

| SEMANTIC INFORMATION | CONTROL DETAILS |
|---|---|
| START OF AIR CONDITIONER | DEVICE CONTROL: START AIR CONDITIONER<br>SPEECH CONTROL: "AIR CONDITIONER HAS BEEN STARTED"<br>DISPLAY CONTROL: DISPLAY INSIDE TEMPERATURE AND SET TEMPERATURE |
| STOP OF AIR CONDITIONER | DEVICE CONTROL: STOP AIR CONDITIONER<br>SPEECH CONTROL: "AIR CONDITIONER HAS BEEN STOPPED." |
| TURNING-ON OF DOME LIGHT | DEVICE CONTROL: TURN ON DOME LIGHT<br>SPEECH CONTROL: "DOME LIGHT HAS BEEN TURNED ON." |
| DISTANCE TO STATION A? | DEVICE CONTROL: "*** [km] FROM HERE."<br>DISPLAY CONTROL: DISPLAY IMAGE OF ROUTE TO STATION A |
| NEARBY RESTAURANT? | DEVICE CONTROL: "THERE ARE *** NEARBY RESTAURANTS."<br>DISPLAY CONTROL: DISPLAY IMAGE OF LIST OF RESTAURANTS |
| WHAT IS ***? | DEVICE CONTROL: "***."<br>DISPLAY CONTROL: DISPLAY IMAGE OF *** ACQUIRED FROM MAP INFORMATION |
| ... | ... |

AGENT SYSTEM, AND, INFORMATION PROCESSING METHOD

CROSS-REFERENCE TO RELATED APPLICATION

Priority is claimed on Japanese Patent Application No. 2019-018971, filed Feb. 5, 2019, the content of which is incorporated herein by reference.

BACKGROUND

Field of the Invention

The invention relates to an agent system, an information processing device, an information processing method, and a storage medium.

Description of Related Art

A human-machine interface that provides information by voice interaction with a person has been studied. In this regard, a technique of determining whether a person has uttered speech and a speech volume and a speech tone of the person on the basis of the circumstances of the person with which a robot is to communicate or a technique of recognizing speech uttered by an occupant using a dictionary in which words are registered and controlling a plurality of control target devices in a passenger compartment on the basis of details of the recognized speech is known (for example, Japanese Patent No. 4976903 and Japanese Unexamined Patent Application, First Publication No. 2007-286136).

SUMMARY

However, in the related art, when a user's speech includes unclear wording, speech contents of the user may not be accurately recognized.

An aspect of the invention is made in consideration of the above-mentioned circumstances and an objective thereof is to provide an agent system, an information processing device, an information processing method, and a storage medium that can more accurately recognize speech contents of a user.

An agent system, an information processing device, an information processing method, and a storage medium according to the invention employ the following conditions:

(1) An agent system according to an aspect of the invention includes: a recognizer configured to recognize speech including speech contents of an occupant in a mobile object; an acquirer configured to acquire an image including the occupant; and an estimator configured to compare wording included in the speech contents of the occupant recognized by the recognizer with unclear information which is stored in a storage and includes wording making the speech contents unclear, to estimate a first direction which is a sight direction of the occupant or a second direction which is indicated by the occupant on the basis of the image acquired by the acquirer when the speech contents of the occupant includes unclear wording, and to estimate an object which is located in the estimated first direction or the estimated second direction, wherein the recognizer is configured to recognize the speech contents of the occupant on the basis of the object estimated by the estimator.

(2) In the aspect of (1), the acquirer is configured to acquire speech of the occupant which is collected by a plurality of microphones, and the estimator is configured to estimate the first direction on the basis of the speech acquired from the plurality of microphones by the acquirer.

(3) In the aspect of (2), the estimator is configured to estimate the first direction on the basis of intensity peak values of the speech acquired from the plurality of microphones and time difference information corresponding to the peak values.

(4) In the aspect of (1), the estimator is configured to estimate an object which is located in the first direction or the second direction from map information which is stored in the storage on the basis of position data of the mobile object and the first direction or the second direction.

(5) In the aspect of (1), the estimator is configured to acquire feature information which is included in the speech contents of the occupant and to estimate an object which is located in the first direction or the second direction on the basis of the acquired feature information.

(6) In the aspect of (1), the estimator is configured to store information on an object which is located in the first direction or the second direction in the storage when a state in which the first direction or the second direction does not change is maintained for a predetermined time or more, and to estimate an object corresponding to the unclear wording out of the information on the object stored in the storage when the speech contents of the occupant include unclear wording.

(7) In the aspect of (1), the estimator is configured to select one or more objects out of a plurality of object candidates on the basis of profile information of the occupant stored in the storage when the plurality of object candidates are estimated to be located in the first direction or the second direction.

(8) In the aspect of (7), the estimator is configured to set priority levels of the plurality of object candidates on the basis of the profile information stored in the storage.

(9) In the aspect of (1), the agent system further includes: a generator configured to generate information corresponding to the speech contents recognized by the recognizer; and an information provider configured to provide the information generated by the generator to the occupant.

(10) An information processing device according to an aspect of the invention controls devices mounted in a mobile object or the mobile object and includes: a recognizer configured to recognize speech including speech contents of an occupant in the mobile object; an acquirer configured to acquire an image including the occupant; and an estimator configured to compare wording included in the speech contents of the occupant recognized by the recognizer with unclear information which is stored in a storage and includes wording making the speech contents unclear, to estimate a first direction which is a sight direction of the occupant or a second direction which is indicated by the occupant on the basis of the image acquired by the acquirer when the speech contents of the occupant includes unclear wording, and to estimate an object which is located in the estimated first direction or the estimated second direction, wherein the recognizer is configured to recognize the speech contents of the occupant on the basis of the object estimated by the estimator.

(11) In the aspect of (10), the information processing device further includes: a generator configured to generate information corresponding to the speech contents recognized by the recognizer; and an information provider configured to provide the information generated by the generator to the occupant, and the generator and the information provider are mounted in the mobile object.

(12) An information processing method according to an aspect of the invention causes a single computer or a plurality of computers to perform: a process of recognizing speech including speech contents of an occupant in a mobile object; a process of acquiring an image including the occupant; a process of comparing wording included in the recognized speech contents of the occupant with unclear information which is stored in a storage and includes wording making the speech contents unclear; a process of acquiring a first direction which is a sight direction of the occupant or a second direction which is indicated by the occupant on the basis of the image when the speech contents of the occupant include unclear wording; a process of estimating an object which is located in the acquired first direction or the acquired second direction; and a process of recognizing the speech contents of the occupant on the basis of the estimated object.

(13) A non-transitory computer-readable storage medium storing a program according to an aspect of the invention is installed in a single computer or a plurality of computers and causes the single computer or the plurality of computers to perform: a process of recognizing speech including speech contents of an occupant in a mobile object; a process of acquiring an image including the occupant; a process of comparing wording included in the recognized speech contents of the occupant with unclear information which is stored in a storage and includes wording making the speech contents unclear; a process of acquiring a first direction which is a sight direction of the occupant or a second direction which is indicated by the occupant on the basis of the image when the speech contents of the occupant include unclear wording; a process of estimating an object which is located in the acquired first direction or the acquired second direction; and a process of recognizing the speech contents of the occupant on the basis of the estimated object.

According to the aspects of (1) to (13), it is possible to more accurately recognize speech contents of a user.

BRIEF DESCRIPTION OF THE DRAWINGS

FIG. 6 is a diagram illustrating an example of details of unclear information;

FIG. 7 is a diagram illustrating an example of details of response information;

DESCRIPTION OF EMBODIMENTS

Hereinafter, embodiments of an agent system, an information processing device, an information processing method, an agent, and a storage medium according to the invention will be described with reference to the accompanying drawings. In the following description, an agent system including an agent device (an example of an information processing device) which is mounted in a vehicle (an example of a mobile object) will be described. The agent system has a function (hereinafter referred to as an agent function) of performing voice interaction with an occupant (an example of a user) in a vehicle or controlling vehicle devices, other devices, and the whole vehicle including traveling. The agent function is realized by a software agent (an intelligent agent) having a certain type of artificial intelligence function.

First Embodiment

System Configuration

Figure 1:
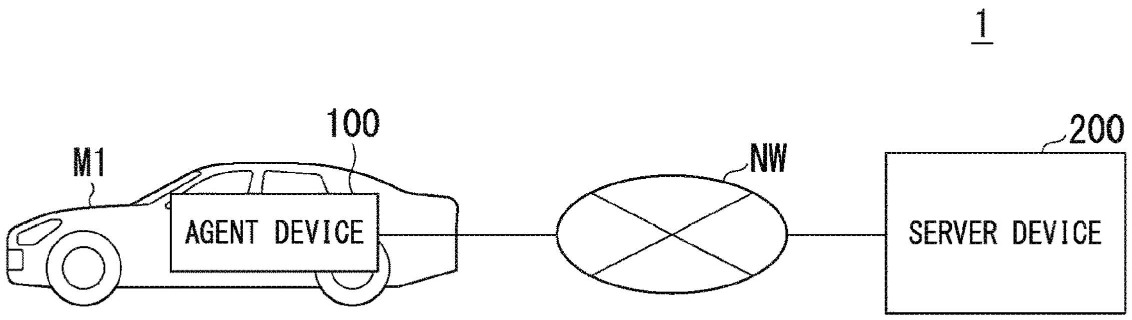
FIG. 1 is a diagram illustrating an example of a configuration of an agent system according to a first embodiment.

FIG. 1 is a diagram illustrating an example of a configuration of an agent system 1 according to a first embodiment.

The agent system 1 according to the first embodiment includes, for example, an agent device 100 which is mounted in a vehicle (hereinafter referred to as a vehicle M) and a server device 200. The vehicle M is, for example, a vehicle with two wheels, three wheels, four wheels, or the like. A drive source of such a vehicle may be an internal combustion engine such as a diesel engine or a gasoline engine, an electric motor, or a combination thereof. An electric motor operates using electric power generated by a power generator connected to an internal combustion engine or electric power discharged from a secondary battery or a fuel cell.

The agent device 100 and the server device 200 are communicatively connected to each other via a network NW. The network NW includes a local area network (LAN) or a wide area network (WAN). The network NW may include, for example, a network using radio communication such as Wi-Fi or Bluetooth (registered trademark which is not described below). The agent system 1 may include a plurality of agent devices 100 and a plurality of server devices 200.

The agent device 100 acquires speech from an occupant of the vehicle M using the agent function and transmits the acquired speech to the server device 200. The agent device 100 performs interaction with the occupant, provides information such as an image or a video, or controls onboard devices or other devices on the basis of data acquired from the server device (for example, agent data).

The server device 200 communicates with the agent device 100 which is mounted in the vehicle M and acquires various types of data from the agent device 100. The server device 200 generates agent data about an inquiry by speech or the like on the basis of the acquired data and provides the generated agent data to the agent device 100. The function of the server device 200 according to the first embodiment is included in the agent function. The function of the server device 200 updates the agent function of the agent device 100 to a more precise function.

Configuration of Agent Device

Figure 2:
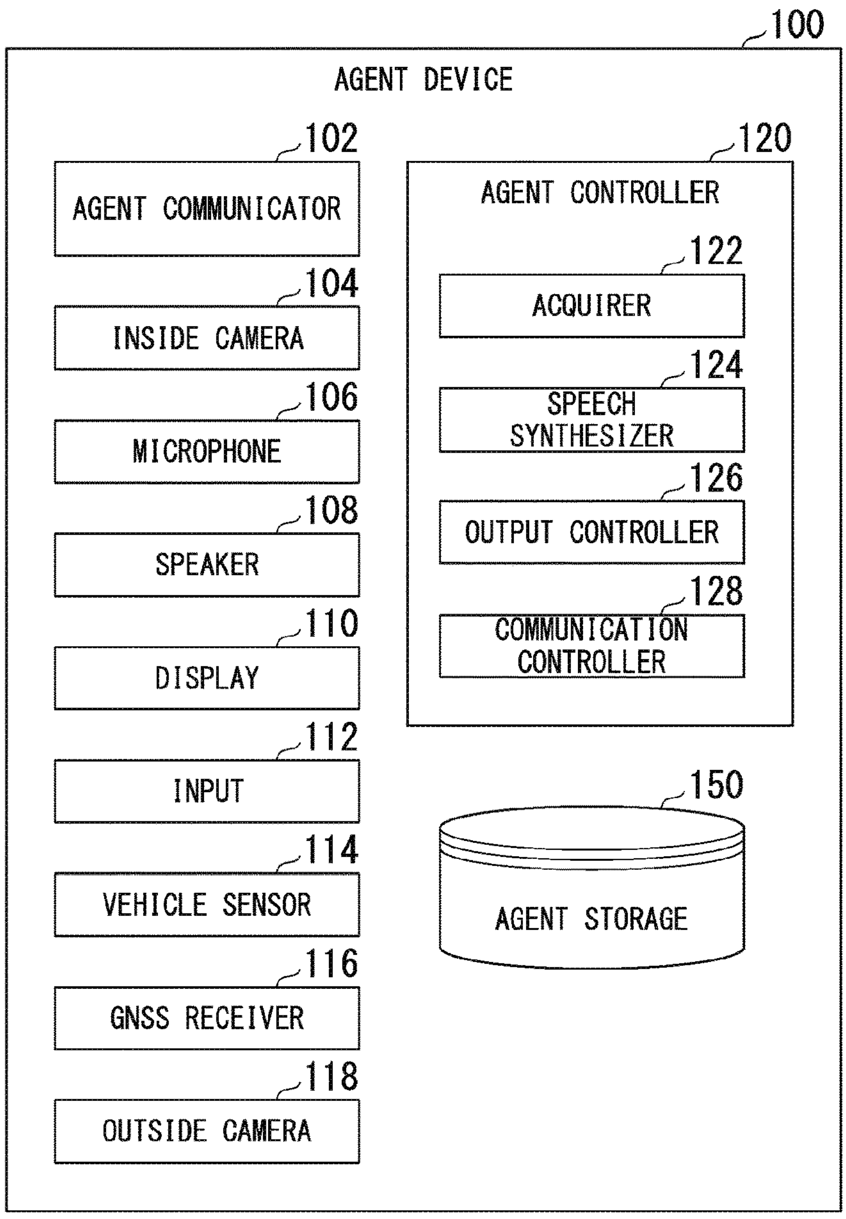
FIG. 2 is a diagram illustrating an example of a configuration of an agent device according to the first embodiment.

FIG. 2 is a diagram illustrating an example of the configuration of the agent device 100 according to the first embodiment. The agent device 100 according to the first embodiment includes, for example, an agent communicator 102, an inside camera 104, a microphone 106, a speaker 108, a display 110, an input 112, a vehicle sensor 114, a global navigation satellite system (GNSS) receiver 116, an outside camera 118, an agent controller 120, and an agent storage 150. These devices or instruments may be connected to each other via a multiple communication line such as a controller area network (CAN) communication line, a serial communication line, a radio communication network, or the like. The configuration of the agent device 100 illustrated in FIG. 2 is merely an example and a part of the configuration may be omitted or other constituents may be added thereto.

The agent communicator 102 includes a communication interface such as a network interface controller (NIC). The agent communicator 102 communicates with the server device 200 or the like via the network NW.

The inside camera 104 is a digital camera using a solid-state imaging device such as a charge-coupled device (CCD) or a complementary metal oxide semiconductor (CMOS). The inside camera 104 is installed, for example, at a predetermined position in a passenger compartment of the vehicle M in which the agent device 100 is mounted. Examples of the predetermined position include an upper part of a front windshield, a rearview mirror, and an instrument panel. The inside camera 104 images a face or the like of each occupant who sits on a seat in the passenger compartment. The inside camera 104 repeatedly images each occupant, for example, at intervals of a predetermined time. The inside camera 104 generates data of an image (hereinafter referred to as first image data) obtained by imaging each occupant and outputs the generated first image data to the agent controller 120.

The microphone 106 is a speech input device that converts speech in the passenger compartment into an electrical signal and collects the speech. The microphone 106 outputs data of the collected speech (hereinafter referred to as speech data) to the agent controller 120. For example, the microphones 106 may be installed in a vicinity in front of each occupant when the occupants are sitting on a seat in the passenger compartment. For example, the microphone 106 is installed in the vicinity of a map lamp, a steering wheel, an instrument panel, or a seat. A plurality of microphones 106 may be installed in the passenger compartment.

The speaker 108 is installed, for example, in the vicinity of a seat in the passenger compartment or in the vicinity of the display 110. The speaker 108 outputs speech on the basis of information which is output from the agent controller 120.

The display 110 includes a display device such as a liquid crystal display (LCD) or an organic electroluminescence (EL) display. The display 110 displays an image on the basis of information which is output from the agent controller 120.

The input 112 is a user interface such as buttons, a keyboard, or a mouse. The input 112 receives an occupant's operation and outputs a signal corresponding to the received operation to the agent controller 120. The input 112 may be a touch panel which is incorporated into the display 110.

Figure 3:
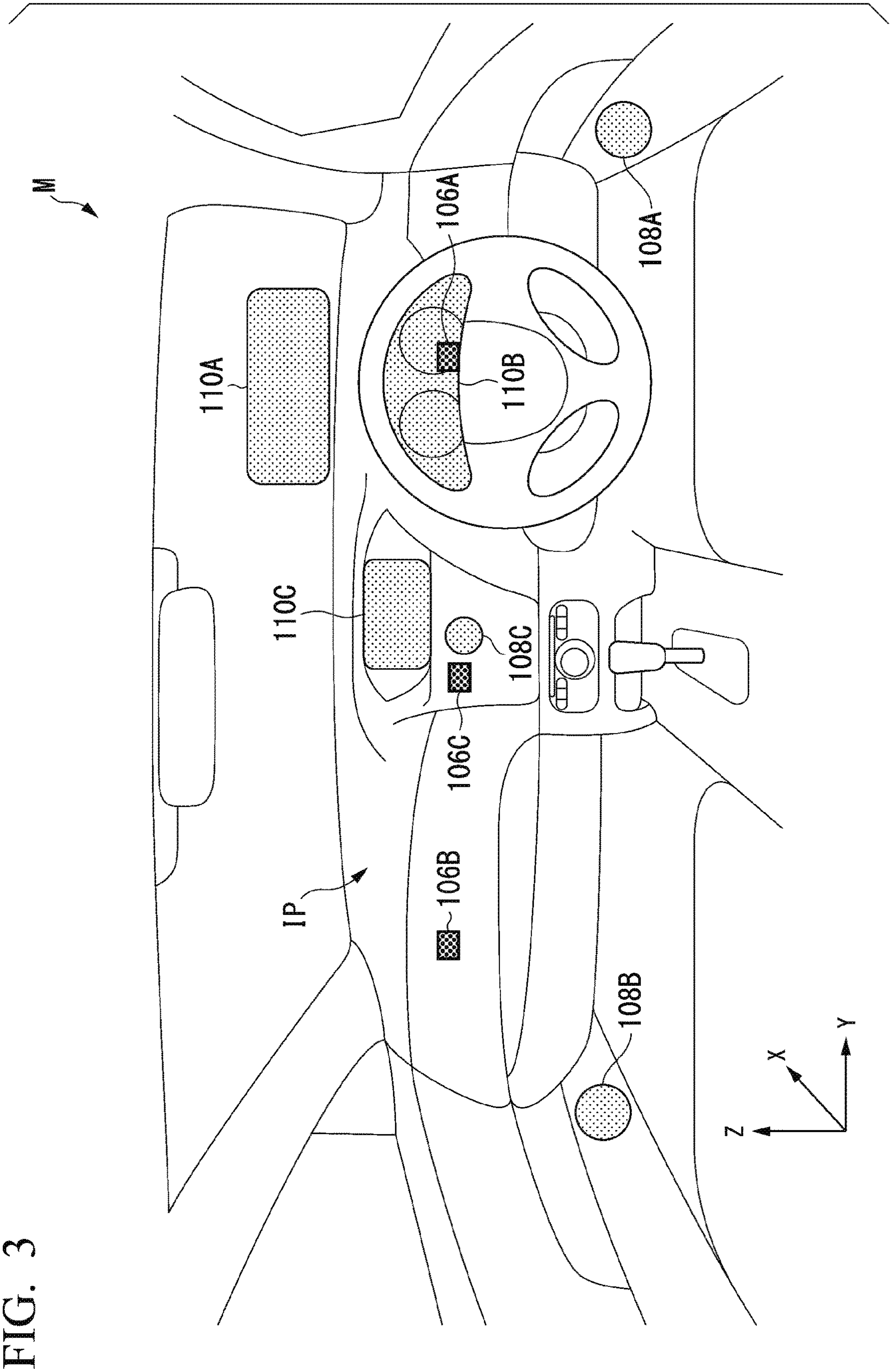
FIG. 3 is a diagram illustrating an example of a passenger compartment when seen from a driver's seat.

FIG. 3 is a diagram illustrating an example of the passenger compartment when seen from a driver's seat. In the passenger compartment in the illustrated example, microphones 106A to 106C, speakers 108A to 108C, and displays 110A to 110C are installed. The microphone 106A is provided, for example, in a steering wheel and mainly collects speech which is uttered by a driver. The microphone 106B is provided, for example, in an instrument panel (a dashboard or a garnish) IP in front of a passenger's seat and mainly collects speech which is uttered by an occupant on the passenger's seat. The microphone 106C is provided, for example, in the vicinity of the center of the instrument panel (between the driver's seat and the passenger's seat).

The speaker 108A is provided, for example, in a lower part of a door on the driver's seat side and the speaker 108B is provided, for example, in a lower part of a door on the passenger's seat side. The speaker 108C is provided, for example, in the vicinity of the display 110C, that is, in the vicinity of the center of the instrument panel IP.

The display 110A is a head-up display (HUD) device that displays a virtual image at an end of a line of sight, for example, when a driver looks outside of the vehicle. The HUD device is, for example, a device that enables an occupant to see a virtual image by projecting light onto the front windshield of the vehicle M or a transparent member called a combiner having light-transmitting characteristics. The occupant is mainly a driver, but may be an occupant other than a driver.

The display 110B is provided in the instrument panel IP in the vicinity of the front of the driver's seat (a seat closest to the steering wheel) and is installed at a position which is visible to an occupant through a gap in the steering wheel or over the steering wheel. The display 110B is, for example, an LCD or an organic EL display device. For example, a speed of the vehicle M, an engine rotation speed, an amount of fuel remaining, a radiator coolant temperature, a mileage, and images of other information are displayed on the display 110B.

The display 110C is installed in the vicinity of the center of the instrument panel IP. The display 110C is, for example, an LCD or an organic EL display device similarly to the display 110B. The display 110C displays contents such as television programs or movies.

Figure 4:
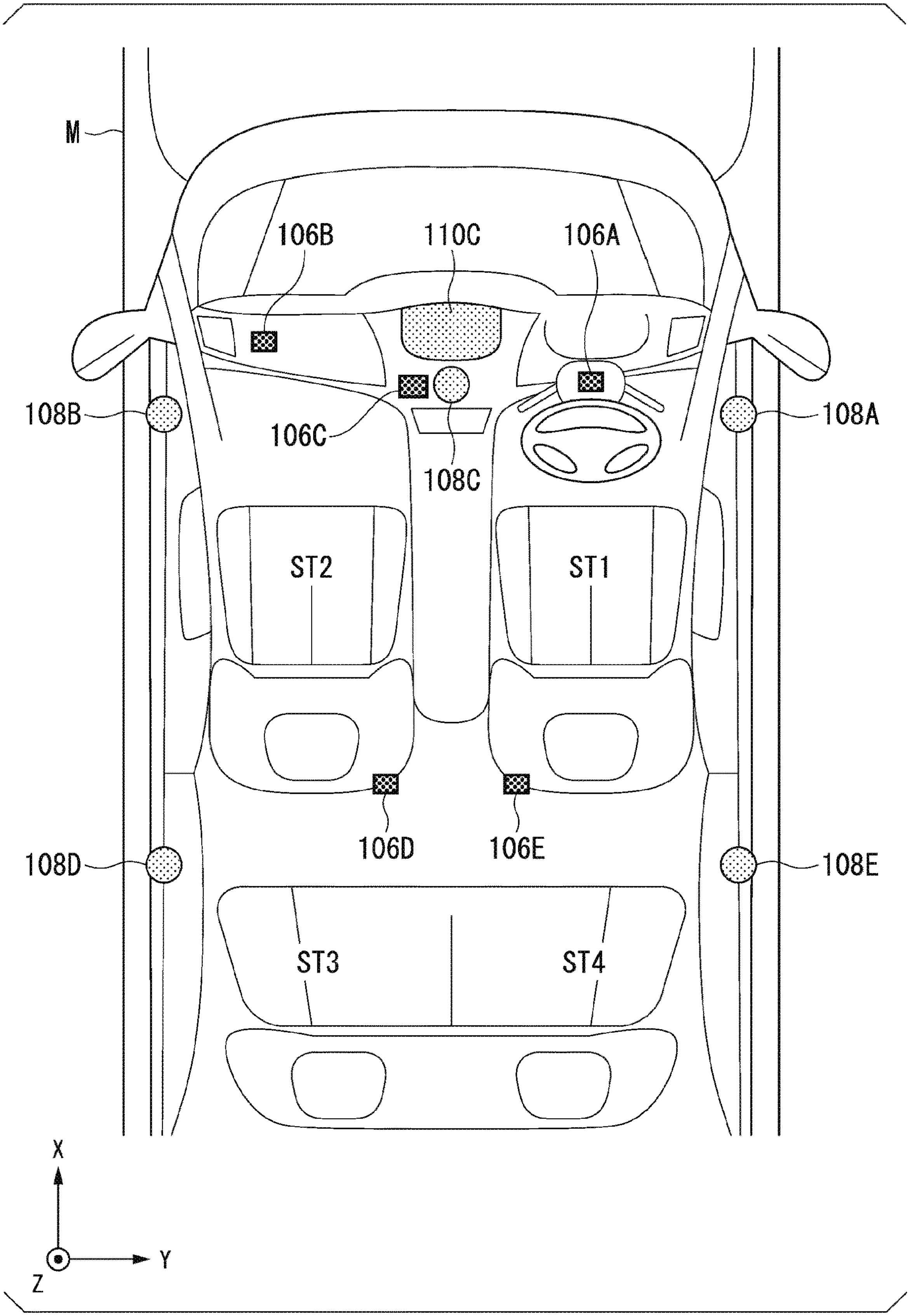
FIG. 4 is a diagram illustrating an example of the passenger compartment when seen from a top of a vehicle.

In the vehicle M, a microphone and a speaker may be additionally provided in the vicinity of the rear seats. FIG. 4 is a diagram illustrating an example of the passenger compartment when seen from the top of the vehicle M. In addition to the microphones and the speakers illustrated in FIG. 3, microphones 106D and 106E and speakers 108D and 108E may be provided in the passenger compartment.

The microphone 106D is provided, for example, in the vicinity of a rear seat ST3 provided behind a passenger's seat ST2 (for example, on the rear surface of the passenger's seat ST2), and mainly collects speech which is uttered by an occupant who sits on the rear seat ST3. The microphone 106E is provided, for example, in the vicinity of a rear seat ST4 provided behind a driver's seat ST1 (for example, on the rear surface of the driver's seat ST1), and mainly collects speech which is uttered by an occupant who sits on the rear seat ST4.

The speaker 108D is provided, for example, in a lower part of a door on the rear seat ST3 side and the speaker 108E is provided, for example, in a lower part of a door on the rear seat ST4 side.

The vehicle M illustrated in FIG. 1 is a vehicle including a steering wheel that can be operated by a driver who is an occupant as illustrated in FIG. 3 or 4, but is not limited thereto. For example, the vehicle M may be a vehicle without a roof, that is, without a passenger compartment (or without a clear partition). In the example illustrated in FIG. 3 or 4, the driver's seat on which a driver who performs a driving operation of the vehicle M sits and the passenger's seat or the rear seats on which other occupants who do not perform a driving operation sit are provided in the same space, but are not limited thereto. In the example illustrated in FIG. 3 or 4, the vehicle M is a vehicle including a steering wheel, but is not limited thereto. For example, the vehicle M may be an automated-driving vehicle in which a driving operating device such as a steering wheel is not provided. An automated-driving vehicle refers to, for example, a vehicle in which driving control is performed by controlling one or both of steering and acceleration/deceleration of the vehicle without depending on an occupant's operation.

Referring back to FIG. 2, the vehicle sensor 114 includes a direction sensor that detects a direction of the vehicle M, a vehicle speed sensor that detects a speed of the vehicle M, an acceleration sensor that detects an acceleration of the vehicle M, a yaw rate sensor that detects an angular velocity about a vertical axis of the vehicle M, and a torque sensor that detects a steering torque. The vehicle sensor 114 outputs data including the detected direction, speed, acceleration, or the like to the agent controller 120.

The GNSS receiver 116 detects a position of the vehicle M on the basis of radio waves which are received from GNSS satellites such as global positioning system (GPS) satellites. The position detected by the GNSS receiver 116 may be, for example, absolute coordinates which are expressed by latitude and longitude. The GNSS receiver 116 outputs data indicating the detected position of the vehicle M (hereinafter referred to as position data) to the agent controller 120.

The outside camera 118 is, for example, a digital camera using a solid-state imaging device such as a CCD or a CMOS. The outside camera 118 is attached on arbitrary positions on the vehicle M. When the side in front is imaged, the outside camera 118 is attached to an upper part of a front windshield or a rear surface of a rearview mirror. When the side to the rear is imaged, the outside camera 118 is attached to an upper part of a rear windshield, a back door, or the like. When a lateral side is imaged, the outside camera 118 is attached to a door mirror or the like. The outside camera 118 images the surroundings of the vehicle M, for example, periodically and repeatedly. The outside camera 118 may be a stereo camera. The outside camera 118 may be an omnidirectional camera that can image an omnidirectional range (360°) with respect to a horizontal direction of the vehicle M. The outside camera 118 generates data of images obtained by imaging the surroundings of the vehicle M (hereinafter referred to as second image data) and outputs the generated second image data to the agent controller 120.

The agent controller 120 includes, for example, an acquirer 122, a speech synthesizer 124, an output controller 126, and a communication controller 128. These elements are embodied, for example, by causing one or more processors (computers) such as a central processing unit (CPU) or a graphics processing unit (GPU) to execute a program (software). Some or all of the elements may be embodied by hardware (circuits including circuitry) such as a large scale integration (LSI), an application specific integrated circuit (ASIC), or a field-programmable gate array (FPGA) or may be embodied by cooperation between software and hardware. The program may be stored in an agent storage 150 (a storage device including a non-transitory storage medium) in advance or may be stored in a removable storage medium (a non-transitory storage medium) such as a DVD or a CD-ROM and installed in the agent storage 150 by attaching the storage medium to a drive device. A combination of the output controller 126, the speakers 108, and the displays 110 is an example of an "information provider."

The agent storage 150 is realized by an HDD, a flash memory, an electrically erasable programmable read only memory (EEPROM), a read only memory (ROM), a random access memory (RAM), or the like. For example, a program which is referred to by the processor is stored in the agent storage 150.

The acquirer 122 acquires the first image data from the inside camera 104 or acquires the second image data from the outside camera 118. The acquirer 122 acquires speech data from the microphones 106, acquires data such the direction or speed of the vehicle M from the vehicle sensor 114, or acquires position data of the vehicle M from the GNSS receiver 116.

When speech control details are included in data received from the server device 200 by the agent communicator 102 (agent data which will be described later), the speech synthesizer 124 generates artificial synthetic speech (hereinafter referred to as an agent voice) on the basis of speech data which is instructed in speech control.

When agent speech is generated by the speech synthesizer 124, the output controller 126 outputs the agent speech to the speakers 108. When image control details are included in the agent data, the output controller 126 displays image data which is instructed in image control on the display 110. The output controller 126 may display an image which is a result of recognition of speech data (text data such as a phrase) on the display 110. When device control details are included in the agent data, the output controller 126 may output a control instruction for target onboard device (for example, air-conditioning equipment in the vehicle or vehicle lamps). The output controller 126 may output various control instructions on traveling of the vehicle M (for example, acceleration/deceleration, stop, or right or left turn).

The communication controller 128 transmits speech data and position data acquired by the acquirer 122 to the server device 200 via the agent communicator 102. The communication controller 128 may transmit the first image data, the second image data, and data such as the direction or speed acquired by the acquirer 122 to the server device 200 via the agent communicator 102.

Configuration of Server Device

Figure 5:
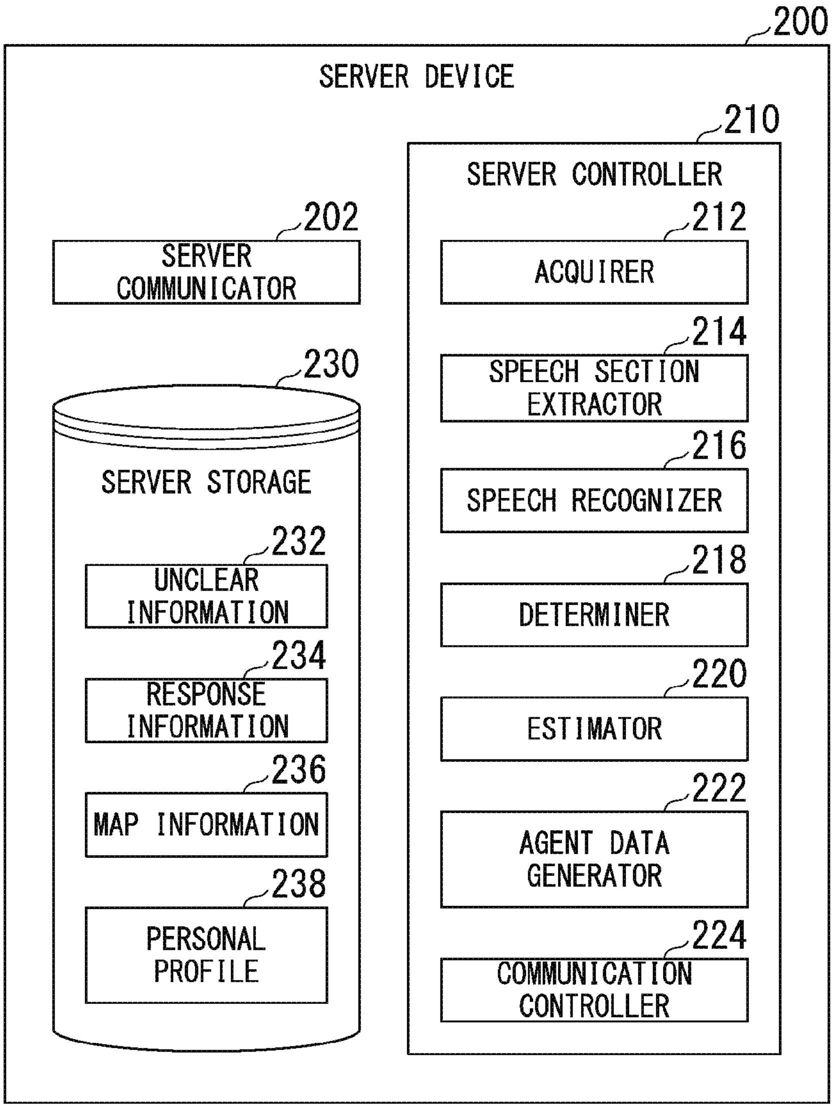
FIG. 5 is a diagram illustrating an example of a configuration of a server device according to the first embodiment.

FIG. 5 is a diagram illustrating an example of the configuration of the server device 200 according to the first embodiment. The server device 200 according to the first embodiment includes, for example, a server communicator 202, a server controller 210, and a server storage 230.

The server communicator 202 includes a communication interface such as an NIC. The server communicator 202 communicates with the agent device 100 which is mounted in each vehicle M via the network NW.

The server controller 210 includes, for example, an acquirer 212, a speech section extractor 214, a speech recognizer 216, a determiner 218, an estimator 220, an agent data generator 222, and a communication controller 224. These elements are embodied, for example, by causing one or more processors (computers) such as a CPU or a GPU to execute a program (software). Some or all of the elements may be embodied by hardware (circuits including circuitry) such as an LSI, an ASIC, or an FPGA or may be embodied by cooperation between software and hardware. The program may be stored in the server storage 230 (a storage device including a non-transitory storage medium) in advance or may be stored in a removable storage medium (a non-transitory storage medium) such as a DVD or a CD-ROM and installed in the server storage 230 by attaching the storage medium to a drive device. The speech recognizer 216 is an example of a "recognizer." The agent data generator 222 is an example of a "generator."

The server storage 230 is realized by an HDD, a flash memory, an EEPROM, a ROM, a RAM, or the like. For example, in addition to the program which is referred to by the processor, unclear information 232, response information 234, map information 236, and a personal profile (an example of profile information) 238 are stored in the server storage 230.

FIG. 6 is a diagram illustrating an example of details of the unclear information 232. The unclear information 232 includes, for example, words and phrases which easily make a position of speech contents as a whole unclear in recognition of speech contents of an occupant by the speech recognizer 216. Words and phrases include, for example, phrases, words, and sentences. In the example illustrated in FIG. 6, the unclear information 232 includes directives such as "this," "its," and "that." The directives include, for example, directives associated with things (for example, this, it, and that), directives associated with places (for example, here, there, and that place), directives associated with directions (for example, this side, its side, and that side).

FIG. 7 is a diagram illustrating an example of details of the response information 234. In the response information 234, for example, control details which are to be performed by the agent controller 120 are correlated with semantic information.

For example, semantic information means meanings which are recognized from the whole speech contents by the speech recognizer 216. Control details of the response information 234 include, for example, information on device control (start and stop) for onboard devices, output control of an agent voice, and image control for display on the display 110. The control details may include control details based on information which is acquired from the map information 236 or information which is acquired from an external device connected via the network NW. "*" illustrated in FIG. 7** is a character string which can be replaced with characters, numerical values, signs, or the like corresponding to semantic information or a response (speech or a screen display).

The map information 236 is, for example, information in which a road shape is expressed by links indicating roads and nodes connected by the links. The map information 236 includes road information and traffic regulation information. The map information 236 may include point of interest (POI) information. The POI information includes, for example, information on objects. The information on objects includes, for example, attributes (genre) of objects, names of objects, feature information of objects, guidance information based on objects, and images of objects. Objects include all things on the ground regardless of being natural things or artificial things. For example, objects include landmarks, sightseeing areas (for example, mountains, waterfalls, and lakes), buildings (for example, temples, bridges, buildings, houses, and stores), and commercial facilities such as theme parks and shopping malls. Objects may include traffic signals, signs, medians, fences, guard rails, poles, utility poles, stopped mobile objects (vehicles), traveling mobile objects, walking pedestrians, and other objects. The feature information on objects includes, for example, information on colors, shapes, and sizes of objects. The guidance information on objects includes, for example, detailed information and campaign information of facilities or stores. The guidance information on objects may include speech information. Various types of information included in the map information 236 are correlated with position coordinates or the like. The map information 236 may be updated from time to time by accessing an external device using the server communicator 202.

In the personal profile 238, for example, information on interest or taste is correlated with an occupant ID which is identification information for identifying an occupant. The personal profile includes, for example, personal information such as names, sexes, and ages of occupants and a use history of the agent system 1. The use history of the agent system 1 includes, for example, a speech history, a traveling history, a response information history, and information on occupants or the number of occupants in the vehicle M. The personal profile 238 may be set by an occupant or may be set by the server device 200 on the basis of machine learning using the use history of the agent system 1.

The acquirer 212 acquires speech data and position data from the agent device 100 via the server communicator 202. The acquirer 212 may acquire first image data, second image data, and data such as a direction or speed via the server communicator 202.

The speech section extractor 214 extracts a period in which an occupant utters speech (hereinafter referred to as a speech section) from the speech data acquired by the acquirer 122. For example, the speech section extractor 214 may extract a speech section on the basis of the amplitude of a speech signal included in the speech data using a zero-crossing method. The speech section extractor 214 may extract a speech section from the speech data on the basis of a Gaussian mixture model (GMM), or may extract a speech section from the speech data by performing a template matching process on a database in which a speech signal specific to the speech section is made into a template.

The speech recognizer 216 recognizes speech data for each speech section which is extracted by the speech section extractor 214 and generates text data including speech contents by making the recognized speech data into text. For example, the speech recognizer 216 generates a spectrogram by separating a speech signal in the speech section into a plurality of frequency bands of low frequencies or high frequencies and performing Fourier transformation on the separate speech signals. The speech recognizer 216 acquires a character string from the spectrogram by inputting the generated spectrogram to a recursive neural network. The recursive neural network may be subjected to learning in advance, for example, using training data in which spectrograms generated from learning speech are correlated with existing character strings corresponding to the learning speech as training labels. The speech recognizer 216 outputs data of the character string acquired from the recursive neural network as text data.

The speech recognizer 216 parses text data of a natural language, divides the text data into morphemes, and recognizes wording included in the text data from the morphemes. When the speech recognizer 216 outputs data of character strings as text data or at the time of parsing based on speech recognition information (a dictionary) stored in a storage which is not illustrated or at the time of recognition from the morphemes, speech data of which speech contents cannot be recognized is considered as unclear information.

The determiner 218 determines whether unclear wording is included in the text data recognized by the speech recognizer 216. The unclear wording includes, for example, wording due to which the whole meaning of speech contents of an occupant is made to be unclear or wording due to which speech contents cannot be recognized. For example, the determiner 218 compares the unclear information 232 stored in the server storage 230 with the wording included in the text data recognized by the speech recognizer 216, determines that unclear wording is included in the text data when wording corresponding to unclear information is included in the wording included in the text data, and determines that unclear wording is not included in the text data when no wording corresponds to unclear information.

When the determiner 218 determines that unclear wording is included in the text data, the estimator 220 estimates a target object in the wording. Details of the function of the estimator 220 will be described later.

When the determiner 218 determines that wording corresponding to wording included in the unclear information 232 is not included in the wording included in the text data, the speech recognizer 216 recognizes the whole meaning of speech contents on the basis of details of the text data. When the determiner 218 determines that wording corresponding to wording included in the unclear information 232 is included in the wording included in the text data, the speech recognizer 216 recognizes the whole meaning of speech contents on the basis of details of the text data and the result of estimation from the estimator 220.

The agent data generator 222 acquires control details correlated with the corresponding semantic information with reference to the semantic information of the response information 234 on the basis of the meaning of speech contents recognized by the speech recognizer 216. When a meaning such as "turn on an air conditioner" or "please power on an air conditioner" is recognized as the result of recognition, the agent data generator 222 replaces the above-mentioned meaning with standard character information "start of an air conditioner," standard command information "TURN_A-C_ON," or the like. Accordingly, even when there is character fluctuation in a request of the speech contents, the control details included in the request can be easily acquired.

The agent data generator 222 generates agent data for performing a process corresponding to the acquired control details (for example, at least one of device control, speech control, and display control).

The communication controller 224 transmits the agent data generated by the agent data generator 222 to the vehicle M via the server communicator 202. Accordingly, control corresponding to the agent data is performed in the vehicle M by the agent controller 120.

Estimator

Figure 8:
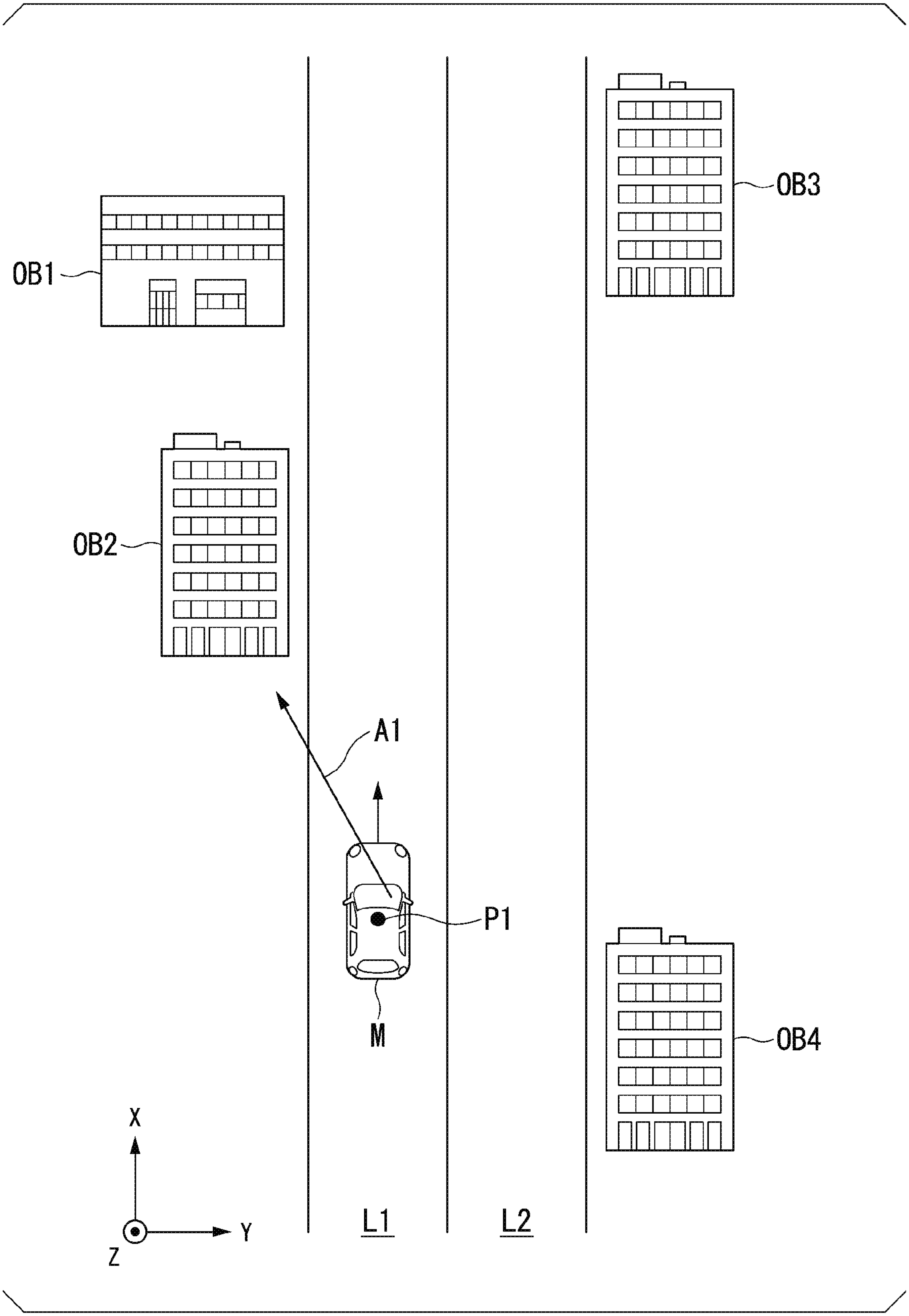
FIG. 8 is a diagram illustrating a process flow which is performed by an estimator.
Figure 9:
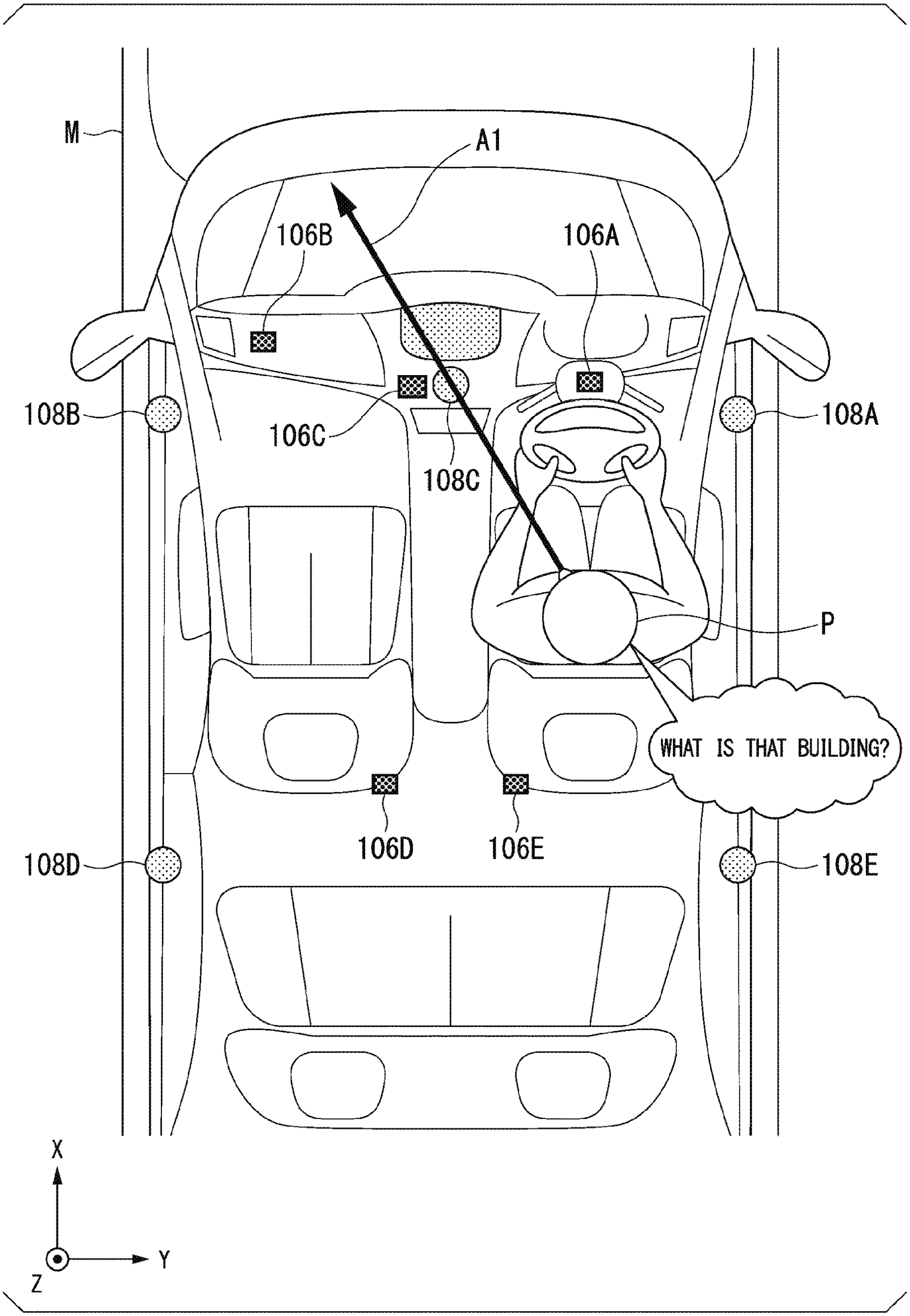
FIG. 9 is a diagram illustrating an example of the passenger compartment in a traveling scene illustrated in FIG. 8.

Details of the function of the estimator 220 will be described below. FIG. 8 is a diagram illustrating a process which is performed by the estimator 220. In the example illustrated in FIG. 8, it is assumed that the vehicle M is traveling along a lane L1 out of lanes L1 and L2 illustrated in the drawing and objects OB1 to OB4 are present near the vehicle M. FIG. 9 is a diagram illustrating an example of a passenger compartment in the traveling scene illustrated in FIG. 8. In the example illustrated in FIG. 9, it is assumed that an occupant P drives the vehicle M.

For example, when the occupant P utters "What is that building?" during traveling on the lane L1, a process of recognizing speech contents is performed by the speech recognizer 216. The determiner 218 determines whether wording corresponding to wording included in the unclear information 232 is included in wording included in the text data recognized by the speech recognizer 216. In the example, "that" corresponds to wording in the unclear information 232. Accordingly, the determiner 218 determines that unclear wording is included in the speech contents. When it is determined that unclear wording is included in the speech contents, the estimator 220 performs analysis of the first image data and acquires a sight direction (a first direction) of the occupant P. A sight direction is, for example, a direction derived from one or both of a direction of a face and a direction of eyes of the occupant P.

For example, the estimator 220 performs an analysis process such as template matching on the first image data and detects one or both of a direction of a face and a direction of eyes of the occupant P from the first image data. For example, the estimator 220 extracts outline information of a head part from the first image data, performs matching with a predetermined template on the basis of arrangement information of parts (eyes, a nose, and a mouse) included in the extracted outline area, and derives a direction of a face. The estimator 220 detects a direction of eyes from a positional relationship between a reference point and a moving point in the eyes of the occupant P which is included in the first data. For example, when the reference point is an inner canthus, the moving point is an iris. When the reference point is a corneal reflection area, the moving point is a pupil. The estimator 220 may estimate a position watched by the occupant or a viewing area in correlation with the estimated sight direction. A viewing area is an area within a predetermined range from a watched position. In the example illustrated in FIG. 9, the estimator 220 estimates that the occupant P faces a direction of an arrow A1 (left-forward in the traveling direction) on the basis of the direction of the face and the direction of eyes.

The estimator 220 may acquire a direction indicated by the occupant (a second direction) which is included in the first image data instead of (or in addition to) estimating the first direction. In this case, the estimator 220 performs an analysis process such as a template matching on the first image data and estimates a fingertip of the occupant P, an object grasped by the occupant P, or a direction indicated by the gesture of the occupant P as the second direction.

Instead of (or in addition to) estimating the first direction using the first image data, the estimator 220 may estimate the first direction on the basis of a directivity of speech from the occupant P. In this case, the estimator 220 estimates the first direction, for example, on the basis of speech acquired from a plurality of microphones selected out of the plurality of microphones 106A to 106E.

Figure 10:
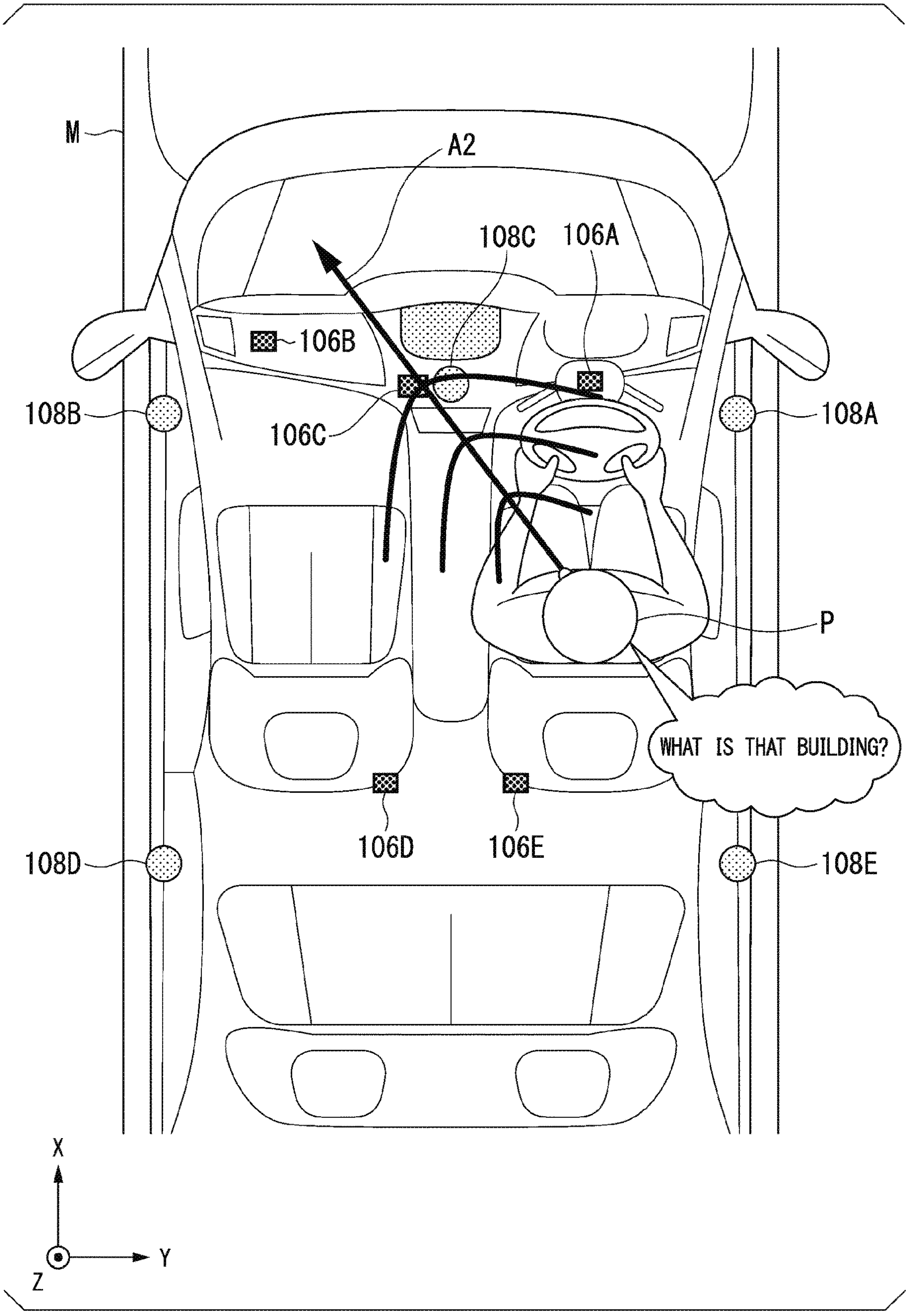
FIG. 10 is a diagram illustrating estimation of a first direction on the basis of speech data.

FIG. 10 is a diagram illustrating estimation of the first direction using speech data. For example, when the occupant P utters "what is that building?" during traveling on the lane L1, the estimator 220 derives intensity (for example, a sound pressure level) peak values of speech acquired from the plurality of microphones 106A to 106E or time different information (for example, a time gap) of the peaks between the microphones. Then, the estimator 220 estimates a direction in which the mouse of the occupant P faces on the basis of the magnitude of the time gap between the microphones and estimates the direction as the first direction.

The estimator 220 may estimate the first direction using a plurality of microphones 106A to 106C installed on the front side in the passenger compartment out of the plurality of microphones 106A to 106E. Using a microphone having the greatest peak value as a reference, the estimator 220 may estimate the first direction using the speech peak values and the time difference information which are acquired from a predetermined number of microphones closer to the reference microphone. When a plurality of speech pieces are collected by the microphones 106, the estimator 220 may extract the peak value of the speech from the occupant P by performing filtering based on a frequency band.

In the example illustrated in FIG. 10, in the relationship between the peak values of the sound pressure level in the microphones 106A to 106C and the time difference information therebetween, it is assumed that the magnitude of the peak value of the microphone 106C is the greatest and the time difference between the peak values of the microphone 106C and the microphone 106A is less than the time difference between the peak values of the microphone 106C and the microphone 106B. In this case, the estimator 220 estimates that the direction of an arrow A2 (the left-front side in the traveling direction) is a direction which the mouse of the occupant P faces. When the directions of the arrows A1 and A2 are estimated, the estimator 220 may estimate the first direction on the basis of the two directions. Accordingly, it is possible to more accurately acquire the first direction.

Then, the estimator 220 estimates an object which is located in the estimated first direction or the estimated second direction. For example, the estimator 220 acquires POI information near the current position of the vehicle M with reference to the map information 236 on the basis of position data of the vehicle M (the position P1 in FIG. 8). Then, the estimator 220 acquires information on an object in the first direction or the second direction with respect to the forward direction of the vehicle M on the basis of the acquired POI information. In the example illustrated in FIG. 8, when the first direction (the direction of the arrow A1) is estimated, the estimator 220 estimates that "that building" is an object OB2 on the basis of the current position P1 of the vehicle M. Accordingly, the speech recognizer 216 recognizes the whole meaning of the speech contents "what is that building?" as a meaning "what is the object OB2?."

Accordingly, on the basis of the semantic information "what is the object OB2?," the agent data generator 222 generates speech data or an image as agent data on the basis of control details correlated with the semantic information with reference to the response information 234. Then, the agent data generator 222 transmits the generated data to the agent device 100 of the vehicle M. Accordingly, in response to an inquiry of the occupant P "what is that building?," for example, synthetic speech "AAA building" is output from the speaker 108 or an image of the AAA building is displayed on the display 110.

Modified Example of Estimator

For example, the estimator 220 may acquire information on the direction or speed of the vehicle M from the agent device 100 in addition to the position data, and estimate the corresponding object in the first direction or the second direction on the basis of the acquired information on the direction or speed. The estimator 220 may estimate corresponding objects in the first direction and the second direction. The estimator 220 may set one direction in combination of the first direction and the second direction and estimate the corresponding object in the set direction.

When feature information of an object is included in the speech contents of the occupant P, the estimator 220 may estimate an object corresponding to the unclear wording on the basis of the feature information. For example, when the occupant P utters "what is that store with the brown roof?," the estimator 220 estimates "brown" and "roof" which are wording subsequent to "that" which is determined to be unclear wording as the feature information and estimates an object having high similarity to the feature information from the surrounding image included in the second image data. The estimator 220 acquires information on objects in the first direction and the second direction from the position P1 of the vehicle M with reference to the map information 236 and extracts an object with a brown roof from the feature information of the objects. Accordingly, it is possible to more accurately estimate an object corresponding to unclear wording on the basis of feature information included in speech contents.

When a state in which there is no change after the sight direction (the first direction) of the occupant P or the direction indicated by the occupant P (the second direction) has been estimated is maintained for a first predetermined time or more, the estimator 220 stores information on the object in the direction in the server storage 230. The case of "there is no change" may include change within a predetermined range. When unclear wording is included in speech data from the occupant P which is acquired within a second predetermined time (for example, several seconds) after the sight direction or the indicated direction has changed, the estimator 220 estimates the object stored in the server storage 230 as an object corresponding to the wording. Accordingly, for example, when the occupant P utters "what is the past building?" after the occupant has watched the object OB4 in FIG. 8 for the first predetermined time or more, the "past building" can be estimated to be the object OB4 in which the line of sight of the occupant P stays long. Accordingly, the speech recognizer 216 can estimate an object corresponding to unclear wording in various scenes and more accurately recognize the whole meaning of speech contents.

When there are a plurality of candidate objects in the first direction or the second direction, the estimator 220 may select one more or objects which are highly associated with the occupant P out of the plurality of candidate objects with reference to the personal profile 238 stored in the server storage 230. In this case, the estimator 220 identifies the occupant P from feature information of the face of the occupant P included in the first image data or identifies the occupant P by allowing the occupant ID or name of the occupant P to be input using the microphones 106 or the input 112 at the time of boarding. The estimator 220 selects an object corresponding to the interest or taste of the occupant P on the basis of the personal profile 238 for the identified occupant P or selects an object which was visited in the past by the occupant P.

Figure 11:
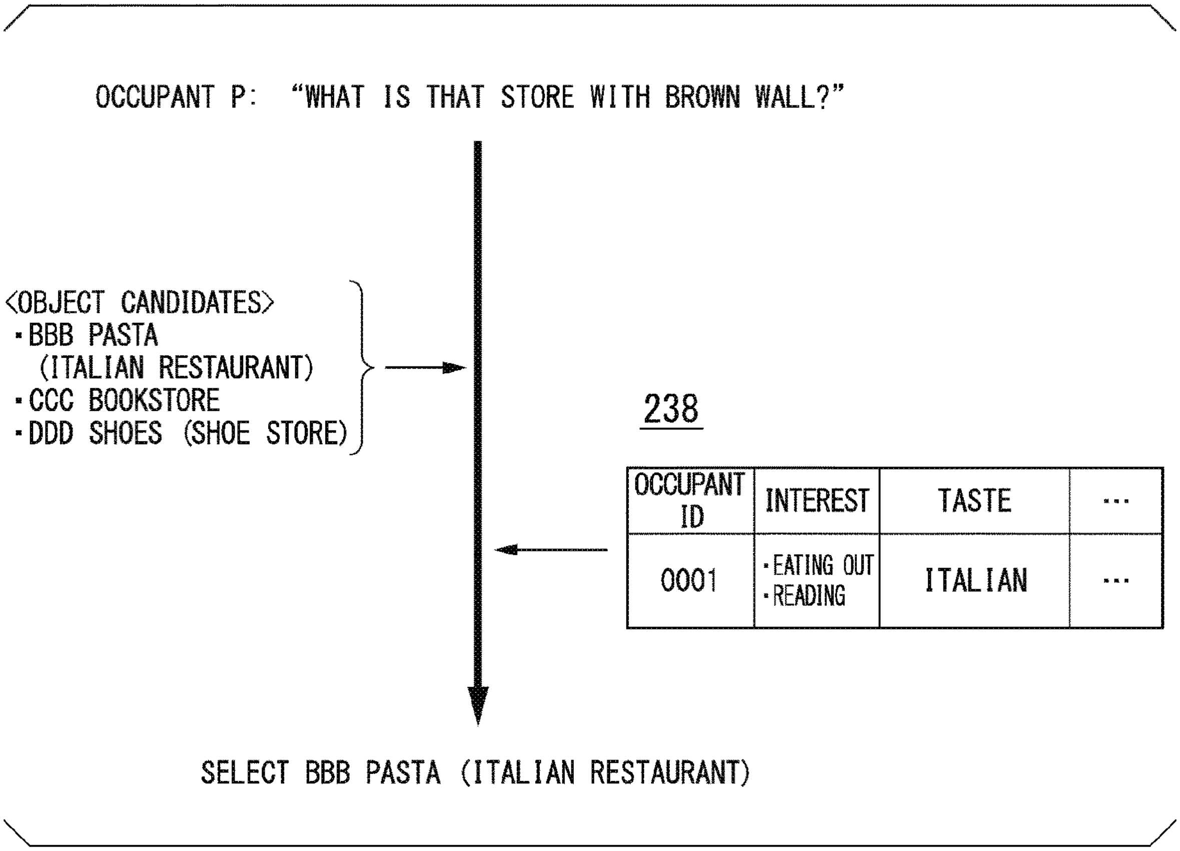
FIG. 11 is a diagram illustrating selection of an object on the basis of a personal profile.

FIG. 11 is a diagram illustrating selection of an object based on the personal profile 238. In the example illustrated in FIG. 11, it is assumed that the occupant P utters "what is that store with the brown wall?." Then, the estimator 220 acquires "BBB Pasta (an Italian restaurant)," "CCC Bookstore," and "DDD Shoes (a shoe store)" as candidate objects for unclear wording "that" on the basis of the position data of the vehicle M and the first direction or the second direction. Then, the estimator 220 acquires interest and taste information correlated with the occupant ID "0001" with reference to the personal profile 238 on the basis of the occupant ID "0001" of the occupant P.

In the example illustrated in FIG. 11, the interest of the occupant P is "eating out" and "reading" and the taste of the occupant P is "Italian." Accordingly, the estimator 220 selects BBB Pasta (an Italian restaurant) which is highly associated with the interest or taste of the occupant P as the object corresponding to the unclear wording "the." In this way, by estimating an object which is highly associated with the occupant P, it is possible to more accurately recognize the meaning of speech contents.

The estimator 220 may set priority levels of objects on the basis of the personal profile 238. In the example illustrated in FIG. 11, the estimator 220 sets the priority level of "BBB Pasta" which is most highly associated with the occupant P to be higher than those of other objects. The estimator 220 sets the priority level of "CCC Bookstore" which is secondly highest associated with the occupant P to be higher than that of "DDD Shoes (a shoe store)." Accordingly, even when a plurality of candidates are presented to the occupant P, the candidates can be presented to the occupant P in the order based on the priority levels thereof.

When priority levels of candidate objects are estimated, the estimator 220 may estimate the priority levels of objects on the basis of behavior prediction based on a destination set by a car navigation device (not illustrated) mounted in the vehicle M or a traveling history of the vehicle M. For example, when it is determined from the past traveling history that the occupant has often come for meals in the same time period, the estimator 220 sets the priority levels of restaurants to be higher out of the candidate objects.

Process Flow

A process flow of the agent system 1 according to the first embodiment will be described below with reference to a flowchart. In the following description, the process flow which is performed by the agent device 100 and a process flow which is performed by the server device 200 will be separately described. The process flows which will be described below may be repeatedly performed at a predetermined time. The predetermined time is, for example, a time at which a specific word (for example, a wakeup word) for starting the agent device has been extracted from speech data or a time at which selection of a switch for starting the agent device 100 out of various switches mounted in the vehicle M has been received.

Figure 12:
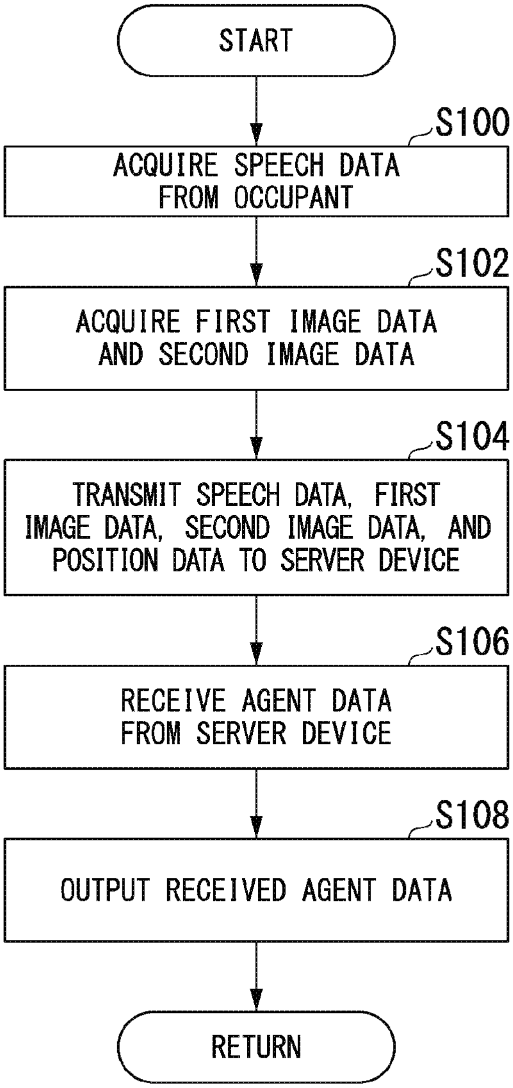
FIG. 12 is a flowchart illustrating an example of a process flow which is performed by the agent device according to the first embodiment.

FIG. 12 is a flowchart illustrating a process flow which is performed by the agent device 100 according to the first embodiment. First, the acquirer 122 of the agent controller 120 acquires speech data of an occupant which is collected by the microphones 106 (Step S100). Then, the acquirer 122 acquires first image data which is captured by the inside camera 104 and second image data which is captured by the outside camera 118 (Step S102). Then, the communication controller 128 transmits the speech data, the first image data, the second image data, and position data to the server device 200 via the agent communicator 102 (Step S104).

Then, the agent communicator 102 receives agent data corresponding to the speech data from the server device 200 (Step S106). The output controller 126 provides information to the occupant by outputting information based on the received agent data using the speakers 108 or the displays 110 (Step S108). In this way, the process flow of the flowchart ends. In the process of Step S108, the output controller 126 may control onboard devices on the basis of the agent data.

Figure 13:
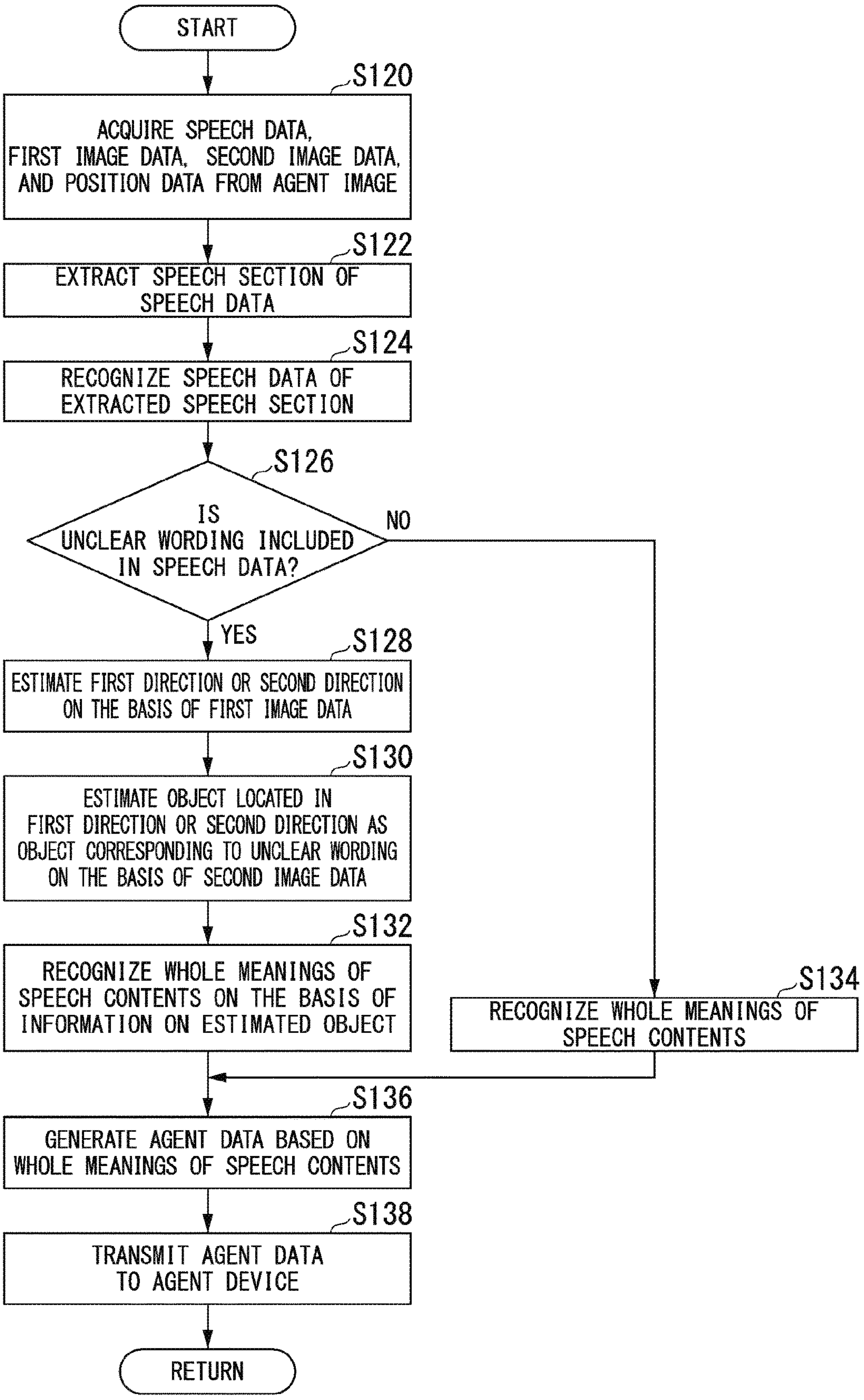
FIG. 13 is a flowchart illustrating an example of a process flow which is performed by the server device according to the first embodiment.

FIG. 13 is a flowchart illustrating an example of a process flow which is performed by the server device 200 according to the first embodiment. First, the server communicator 202 acquires speech data, first image data, second image data, and position data from the agent device 100 (Step S120). Then, the speech section extractor 214 extracts a speech section included in the speech data (Step S122). Then, the speech recognizer 216 recognizes speech data in the extracted speech section (Step S124). Then, the determiner 218 determines whether unclear wording is included in the speech data (Step S126). When it is determined that unclear wording is included in the speech data, the estimator 220 estimates a sight direction (a first direction) of the occupant or a direction indicated by the occupant (a second direction) on the basis of the first image data (Step S128). Then, the estimator 220 estimates an object in the first direction or the second direction as an object corresponding to the unclear wording on the basis of the second image data (Step S130).

Then, the speech recognizer 216 recognizes the whole meaning of speech contents on the basis of information on the object estimated by the estimator 220 (Step S132). When it is determined in the process of Step S126 that unclear wording is not included in the speech data, the speech recognizer 216 recognizes the whole meaning of the speech contents (Step S134).

After the process of Step S132 or S134 has been performed, the agent data generator 222 generates agent data based on the whole meaning of the speech contents (Step S136). Then, the communication controller 224 of the server controller 210 transmits the agent data to the agent device 100 via the server communicator 202 (Step S138). In this way, the process flow of the flowchart ends.

According to the first embodiment described above, it is possible to more accurately recognize speech contents of a user (an occupant). Specifically, according to the first embodiment, when unclear wording is included in speech contents of an occupant, an object corresponding to the unclear wording can be estimated on the basis of a sight direction of the occupant or a direction indicated by the occupant and the whole meaning of the speech contents including the estimated object can be more accurately recognized. Accordingly, for example, when an occupant utters speech including intuitive wording such as "that" or "this" for an object outside the vehicle, it is possible to provide more appropriate information to the occupant.

Second Embodiment

In the first embodiment described above, the agent device 100 mounted in the vehicle M and the server device 200 are different devices, but the invention is not limited thereto. For example, elements of the server device 200 associated with the agent function may be included as elements of the agent device 100. In this case, the server device 200 may function as a virtual machine which is virtually realized by the agent controller 120 of the agent device 100. Hereinafter, an agent device 100A including the elements of the server device 200 will be described as a second embodiment. In this case, the agent device 100A is an example of an "agent system." In the second embodiment, the same elements as in the first embodiment will be referred to by the same reference signs and detailed description thereof will not be repeated.

Figure 14:
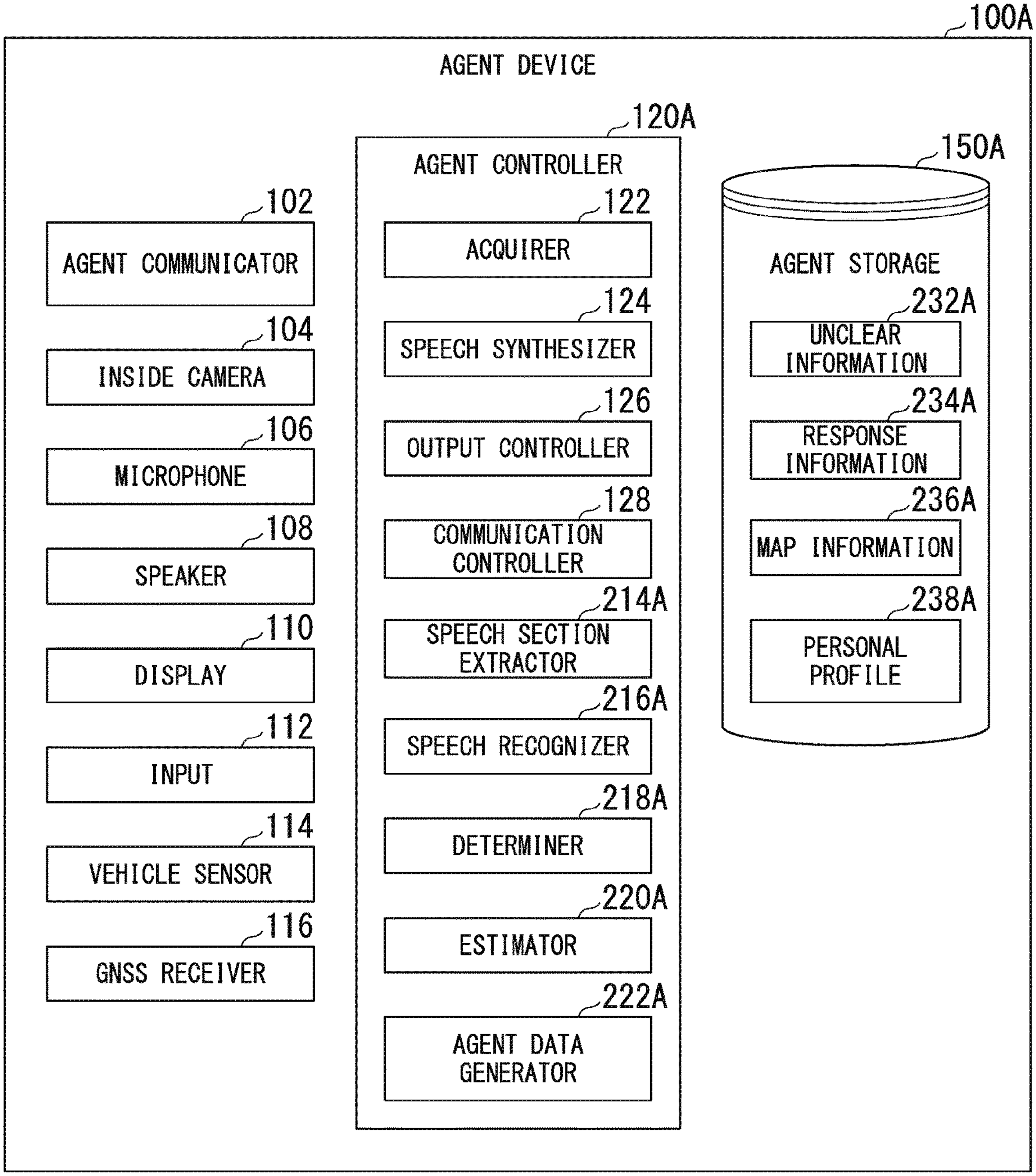
FIG. 14 is a diagram illustrating an example of a configuration of an agent device according to a second embodiment.

FIG. 14 is a diagram illustrating an example of the agent device 100A according to the second embodiment. The agent device 100A includes, for example, an agent communicator 102, an inside camera 104, a microphone 106, a speaker 108, a display 110, an input 112, a vehicle sensor 114, a GNSS receiver 116, an agent controller 120A, and an agent storage 150A. The agent controller 120A includes, for example, an acquirer 122, a speech synthesizer 124, an output controller 126, a communication controller 128, a speech section extractor 214A, a speech recognizer 216A, a determiner 218A, an estimator 220A, and an agent data generator 222A.

In the agent storage 150A, for example, unclear information 232A, response information 234A, map information 236A, a personal profile 238A, and the like are stored in addition to a program which is referred to by a processor. The unclear information 232A, the response information 234A, and the map information 236A may be updated by newest information which is acquired from the server device 200. In the personal profile 238A, a personal profile 238A corresponding to an occupant who boards a vehicle M is stored.

Process Flow

Figure 15:
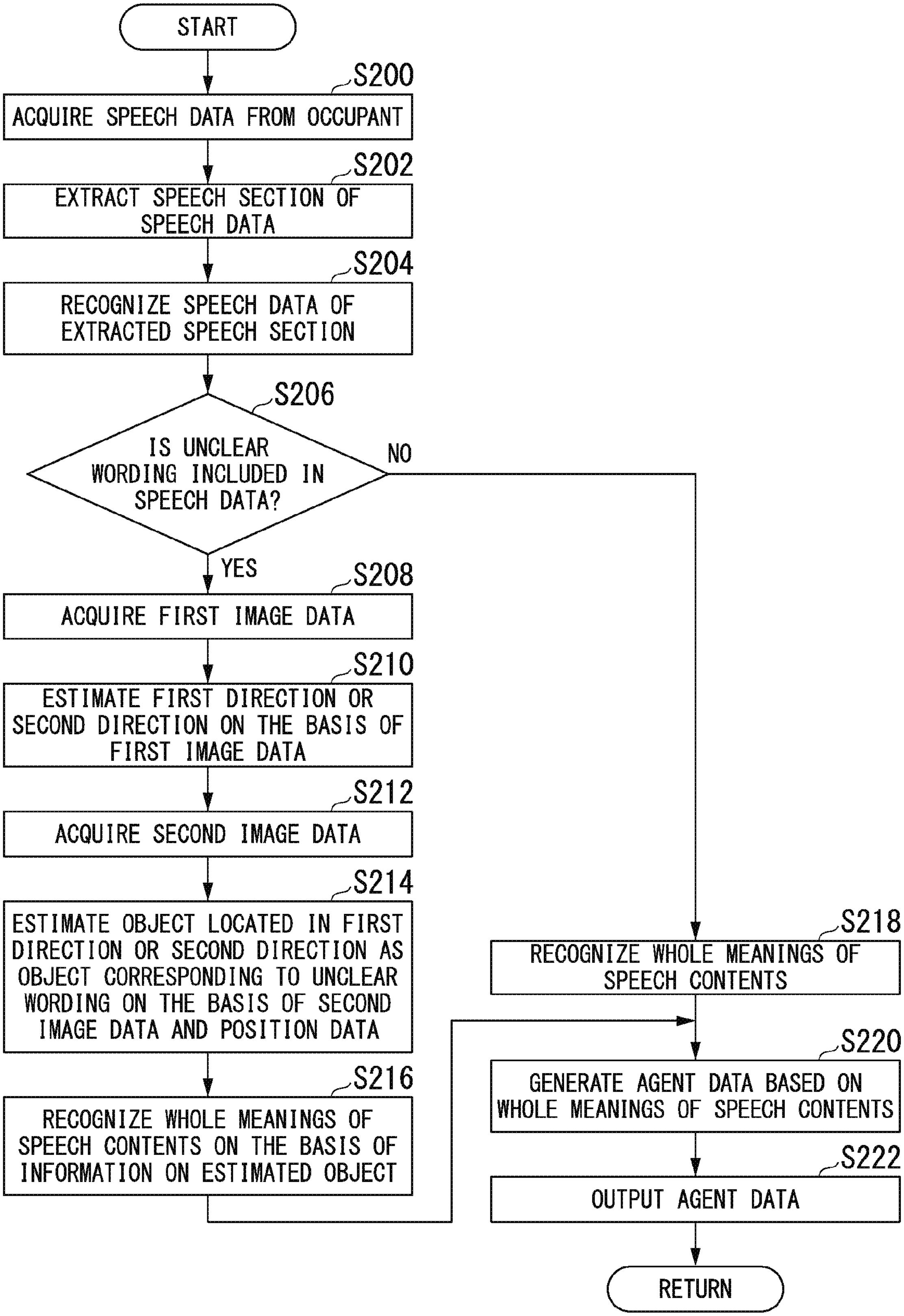
FIG. 15 is a flowchart illustrating an example of a process flow which is performed by the agent device according to the second embodiment.

FIG. 15 is a flowchart illustrating a process flow which is performed by the agent device 100A according to the second embodiment. The process flow which will be described below may be repeatedly performed at a predetermined time similarly to the process flow in the first embodiment. First, the acquirer 122 of the agent controller 120A acquires speech data of an occupant which is collected by the microphone 106 (Step S200). Then, the speech section extractor 214A extracts a speech section of the acquired speech data (Step S202). Then, the speech recognizer 216A recognizes speech data in the extracted speech section (Step S204).

Then, the determiner 218A determines whether unclear wording is included in the speech data (Step S206). When it is determined that unclear wording is included in the speech data, the acquirer 122 acquires first image data (Step S208). Then, the estimator 220A estimates the first direction or the second direction on the basis of the acquired first image data (Step S210). Then, the acquirer 122 acquires second image data (Step S212). Then, the estimator 220A estimates an object in the first direction or the second direction as an object corresponding to the unclear wording on the basis of the acquired second image data and position data of the vehicle M (Step S214). Then, the speech recognizer 216A recognizes the whole meaning of the speech contents on the basis of information on the estimated object (Step S216).

When it is determined in the process of Step S206 that unclear wording is not included in the speech data, the speech recognizer 216A recognizes the whole meaning of the speech contents from the speech data (Step S218).

After the process of Step S216 or S218 has been performed, the agent data generator 222A generates agent data based on the whole meaning of the speech contents (Step S220) The output controller 126A provides information to the occupant by outputting information based on the agent data using the speaker 108 or the display 110 (Step S222). In this way, the process flow of the flowchart ends. In the process of Step S222, the output controller 126 may control onboard devices on the basis of the agent data.

According to the second embodiment described above, the same advantageous effects as in the first embodiment can be achieved and since communication with the server device 200 does not need to be performed via the network NW whenever speech is acquired from an occupant, it is possible to more rapidly recognize speech contents. Even when the vehicle M cannot communicate with the server device 200, it is possible to generate agent data and to provide information to an occupant.

While embodiments of the invention have been described above, the invention is not limited to the embodiments and can be subjected various modifications and substitutions without departing from the gist of the invention.

For example, in the above-mentioned embodiments, a vehicle is described as an example of a mobile object, but the invention is not limited thereto. For example, a mobile object may be another mobile object such as a ship or a flying object. In this case, the agent device 100 has only to be installed in, for example, cabins of a plurality of cruise ships or a plurality of sightseeing aircrafts. When a steerer who performs a driving operation of a mobile object is in the mobile object, the agent device 100 can entertain other occupants (passengers) who do not perform a driving operation by performing voice interaction with the other occupants and thus a cabin crew can concentrate on other services for the passengers. The agent device 100 may be installed in a taxi, a bus, or the like. In this case, since the agent device 100 can entertain passengers by performing voice interaction with the passengers, a driver of such a vehicle can concentrate on a driving operation. While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An agent system comprising:

a recognizer configured to recognize speech including speech contents of an occupant in a mobile object;

an acquirer configured to acquire an image including the occupant; and an estimator configured to compare wording included in the speech contents of the occupant recognized by the recognizer with unclear information which is stored in a storage and includes wording making the speech contents unclear, to estimate a first direction which is a sight direction of the occupant or a second direction which is indicated by the occupant on the basis of the image acquired by the acquirer when the speech contents of the occupant includes unclear wording, and to estimate an object which is located in the estimated first direction or the estimated second direction, wherein the recognizer is configured to recognize the speech contents of the occupant on the basis of the object estimated by the estimator, wherein the estimator is configured to estimate an object which is located in the first direction or the second direction from map information which is stored in the storage on the basis of position data of the mobile object and the first direction or the second direction.

2. The agent system according to claim 1, wherein the acquirer is configured to acquire speech of the occupant which is collected by a plurality of microphones, and wherein the estimator is configured to estimate the first direction on the basis of the speech acquired from the plurality of microphones by the acquirer.

3. The agent system according to claim 2, wherein the estimator is configured to estimate the first direction on the basis of intensity peak values of the speech acquired from the plurality of microphones and time difference information corresponding to the peak values.

4. The agent system according to claim 1, wherein the estimator is configured to acquire feature information which is included in the speech contents of the occupant and to estimate an object which is located in the first direction or the second direction on the basis of the acquired feature information.

5. The agent system according to claim 1, wherein the estimator is configured to:

store information on an object which is located in the first direction or the second direction in the storage when a state in which the first direction or the second direction does not change is maintained for a predetermined time or more; and estimate an object corresponding to the unclear wording out of the information on the object stored in the storage when the speech contents of the occupant include unclear wording.

6. The agent system according to claim 1, wherein the estimator is configured to select one or more objects out of a plurality of object candidates on the basis of profile information of the occupant stored in the storage when the plurality of object candidates are estimated to be located in the first direction or the second direction.

7. The agent system according to claim 6, wherein the estimator is configured to set priority levels of the plurality of object candidates on the basis of the profile information stored in the storage.

8. The agent system according to claim 1, further comprising:

a generator configured to generate information corresponding to the speech contents recognized by the recognizer; and an information provider configured to provide the information generated by the generator to the occupant.

9. An information processing method of causing a single computer or a plurality of computers to perform:

a process of recognizing speech including speech contents of an occupant in a mobile object;

a process of acquiring an image including the occupant;

a process of comparing wording included in the recognized speech contents of the occupant with unclear information which is stored in a storage and includes wording making the speech contents unclear;

a process of acquiring a first direction which is a sight direction of the occupant or a second direction which is indicated by the occupant on the basis of the image when the speech contents of the occupant include unclear wording;

a process of estimating an object which is located in the acquired first direction or the acquired second direction; and a process of recognizing the speech contents of the occupant on the basis of the estimated object, wherein the process of estimating estimates object located in the first direction or the second direction from map information which is stored in the storage on the basis of position data of the mobile object and the first direction or the second direction.

10. An agent system comprising:

a recognizer configured to recognize speech including speech contents of an occupant in a mobile object;

an acquirer configured to acquire an image including the occupant; and an estimator configured to compare wording included in the speech contents of the occupant recognized by the recognizer with unclear information which is stored in a storage and includes wording making the speech contents unclear, to estimate a first direction which is a sight direction of the occupant or a second direction which is indicated by the occupant on the basis of the image acquired by the acquirer when the speech contents of the occupant includes unclear wording, and to estimate an object which is located in the estimated first direction or the estimated second direction, wherein the recognizer is configured to recognize the speech contents of the occupant on the basis of the object estimated by the estimator, wherein the estimator is configured to acquire feature information which is included in the speech contents of the occupant and to estimate an object which is located in the first direction or the second direction on the basis of the acquired feature information.

11. An agent system comprising:

a recognizer configured to recognize speech including speech contents of an occupant in a mobile object;

an acquirer configured to acquire an image including the occupant; and an estimator configured to compare wording included in the speech contents of the occupant recognized by the recognizer with unclear information which is stored in a storage and includes wording making the speech contents unclear, to estimate a first direction which is a sight direction of the occupant or a second direction which is indicated by the occupant on the basis of the image acquired by the acquirer when the speech contents of the occupant includes unclear wording, and to estimate an object which is located in the estimated first direction or the estimated second direction, wherein the recognizer is configured to recognize the speech contents of the occupant on the basis of the object estimated by the estimator, wherein the estimator is configured to select one or more objects out of a plurality of object candidates on the basis of profile information of the occupant stored in the storage when the plurality of object candidates are estimated to be located in the first direction or the second direction.

12. An information processing method of causing a single computer or a plurality of computers to perform:

a process of recognizing speech including speech contents of an occupant in a mobile object;

a process of acquiring an image including the occupant;

a process of comparing wording included in the recognized speech contents of the occupant with unclear information which is stored in a storage and includes wording making the speech contents unclear;

a process of acquiring a first direction which is a sight direction of the occupant or a second direction which is indicated by the occupant on the basis of the image when the speech contents of the occupant include unclear wording;

a process of estimating an object which is located in the acquired first direction or the acquired second direction;

a process of recognizing the speech contents of the occupant on the basis of the estimated object;

a process of acquiring feature information which is included in the speech contents of the occupant; and a process of estimating an object which is located in the first direction or the second direction on the basis of the acquired feature information.

13. An information processing method of causing a single computer or a plurality of computers to perform:

a process of recognizing speech including speech contents of an occupant in a mobile object;

a process of acquiring an image including the occupant;

a process of comparing wording included in the recognized speech contents of the occupant with unclear information which is stored in a storage and includes wording making the speech contents unclear;

a process of acquiring a first direction which is a sight direction of the occupant or a second direction which is indicated by the occupant on the basis of the image when the speech contents of the occupant include unclear wording;

a process of estimating an object which is located in the acquired first direction or the acquired second direction;

a process of recognizing the speech contents of the occupant on the basis of the estimated object;

a process of selecting one or more objects out of a plurality of object candidates on the basis of profile information of the occupant stored in the storage when the plurality of object candidates are estimated to be located in the first direction or the second direction.

14. An agent system comprising:

a recognizer configured to recognize speech including speech contents of an occupant in a mobile object;

an acquirer configured to acquire an image including the occupant; and an estimator configured to compare wording included in the speech contents of the occupant recognized by the recognizer with unclear information which is stored in a storage and includes wording making the speech contents unclear, to estimate a first direction which is a sight direction of the occupant or a second direction which is indicated by the occupant on the basis of the image acquired by the acquirer when the speech contents of the occupant includes unclear wording, and to estimate an object which is located in the estimated first direction or the estimated second direction, wherein the recognizer is configured to recognize the speech contents of the occupant on the basis of the object estimated by the estimator, wherein the acquirer is configured to acquire speech of the occupant which is collected by a plurality of microphones, wherein the estimator is configured to estimate the first direction on the basis of the speech acquired from the plurality of microphones by the acquirer, and wherein the estimator is configured to estimate the first direction on the basis of intensity peak values of the speech acquired from the plurality of microphones and time difference information corresponding to the peak values.

15. An agent system comprising:

a recognizer configured to recognize speech including speech contents of an occupant in a mobile object;

an acquirer configured to acquire an image including the occupant; and an estimator configured to compare wording included in the speech contents of the occupant recognized by the recognizer with unclear information which is stored in a storage and includes wording making the speech contents unclear, to estimate a first direction which is a sight direction of the occupant or a second direction which is indicated by the occupant on the basis of the image acquired by the acquirer when the speech contents of the occupant includes unclear wording, and to estimate an object which is located in the estimated first direction or the estimated second direction, wherein the recognizer is configured to recognize the speech contents of the occupant on the basis of the object estimated by the estimator, wherein the estimator is configured to:

store information on an object which is located in the first direction or the second direction in the storage when a state in which the first direction or the second direction does not change is maintained for a predetermined time or more; and estimate an object corresponding to the unclear wording out of the information on the object stored in the storage when the speech contents of the occupant include unclear wording.

* * * * *